(12) United States Patent
Delaney et al.

(10) Patent No.: US 11,017,044 B2
(45) Date of Patent: May 25, 2021

(54) APPARATUS, METHOD, AND PROGRAM PRODUCT FOR FILTERING SIMILAR CONTENT ITEMS

(71) Applicant: LENOVO (Singapore) PTE. LTD., New Tech Park (SG)

(72) Inventors: Mark Patrick Delaney, Raleigh, NC (US); Nathan J. Peterson, Oxford, NC (US); John Carl Mese, Cary, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 184 days.

(21) Appl. No.: 16/118,262

(22) Filed: Aug. 30, 2018

(65) Prior Publication Data
US 2020/0074008 A1 Mar. 5, 2020

(51) Int. Cl.
*G06F 16/95* (2019.01)
*G06F 16/9535* (2019.01)
*G06Q 50/00* (2012.01)

(52) U.S. Cl.
CPC ......... *G06F 16/9535* (2019.01); *G06Q 50/01* (2013.01)

(58) Field of Classification Search
CPC .............................. H04L 51/12; G06F 16/9535
USPC .......... 707/751, 732, 724; 715/205; 709/206
See application file for complete search history.

(56) References Cited

U.S. PATENT DOCUMENTS

| | | | | |
|---|---|---|---|---|
| 8,667,069 B1* | 3/2014 | Connelly | ............... | H04L 51/32 709/206 |
| 2003/0150794 A1* | 8/2003 | Blase | ................... | B01D 67/009 210/498 |
| 2005/0080642 A1* | 4/2005 | Daniell | ............... | G06Q 10/107 709/206 |
| 2005/0097174 A1* | 5/2005 | Daniell | ................... | H04L 51/12 709/206 |
| 2006/0129914 A1* | 6/2006 | Ellis | ...................... | G06F 3/0482 715/275 |
| 2010/0057870 A1* | 3/2010 | Ahn | ........................ | H04L 51/22 709/206 |
| 2015/0227531 A1* | 8/2015 | Kulesza | .................. | G06F 16/44 715/739 |
| 2015/0317398 A1* | 11/2015 | Phillips | ................. | G06F 16/285 707/734 |
| 2016/0070794 A1* | 3/2016 | Peng | ...................... | G06F 16/951 707/723 |

\* cited by examiner

*Primary Examiner* — Baoquoc N To
(74) *Attorney, Agent, or Firm* — Kunzler Bean & Adamson (57) ABSTRACT

Apparatuses, methods, and program products are disclosed for filtering similar content items. One apparatus includes a processor and a memory that stores code executable by the processor. The code is executable by the processor to compare, by use of the processor, a content item to previous content items corresponding to an account. The code is executable by the processor to determine whether the content item is a similar content item for the account based on the comparison between the content item and the previous content items. The code is executable by the processor to, in response to the content item being a similar content item for the account, determine whether to filter the content item from the account.

18 Claims, 10 Drawing Sheets

APPARATUS, METHOD, AND PROGRAM PRODUCT FOR FILTERING SIMILAR CONTENT ITEMS

FIELD

The subject matter disclosed herein relates to content and more particularly relates to filtering similar content items.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions. For example, information handling devices may be used for displaying content, such as displaying content in a social media account. In certain configurations, the content may be content that a user has seen before.

BRIEF SUMMARY

An apparatus for filtering similar content items is disclosed. A method and computer program product also perform the functions of the apparatus. In one embodiment, the apparatus includes a processor and a memory that stores code executable by the processor. The code, in various embodiments, is executable by the processor to compare, by use of the processor, a content item to previous content items corresponding to an account. The code, in certain embodiments, is executable by the processor to determine whether the content item is a similar content item for the account based on the comparison between the content item and the previous content items. The code, in some embodiments, is executable by the processor to, in response to the content item being a similar content item for the account, determine whether to filter the content item from the account.

In some embodiments, the code executable by the processor determines whether to filter the content item from the account by determining to filter the content item from the account based on an account setting. In one embodiment, the code executable by the processor stores the filtered content item in a previously filtered content item list.

In various embodiments, the code executable by the processor determines whether to filter the content item from the account by displaying an indicator indicating that the content item is a similar content item. In some embodiments, the code executable by the processor, in response to displaying the indicator, receives a selection that indicates to filter the content item from the account.

A method for filtering similar content items, in one embodiment, includes comparing, by use of a processor, a content item to previous content items corresponding to an account. In certain embodiments, the method includes determining whether the content item is a similar content item for the account based on the comparison between the content item and the previous content items. In some embodiments, the method includes, in response to the content item being a similar content item for the account, determining whether to filter the content item from the account.

In some embodiments, comparing the content item to the previous content items corresponding to the account includes comparing an item selected from the group including an image, a news story, a blog post, a video, a social media post, and an advertisement with the previous content items. In various embodiments, comparing the content item to the previous content items corresponding to the account includes comparing the content item in a channel to the previous content items in the channel. In one embodiment, comparing the content item to the previous content items corresponding to the account includes comparing the content item in a channel to the previous content items in multiple channels including the channel.

In some embodiments, determining whether the content item is a similar content item for the account based on the comparison between the content item and the previous content items includes determining whether the content item matches a previous content item of the previous content items. In certain embodiments, determining whether the content item is a similar content item for the account based on the comparison between the content item and the previous content items includes determining whether the content item is within a relational tolerance level of a previous content item of the previous content items.

In some embodiments, determining whether to filter the content item from the account includes determining to filter the content item from the account based on an account setting. In various embodiments, the method includes storing the filtered content item in a previously filtered content item list. In certain embodiments, determining whether to filter the content item from the account includes displaying an indicator indicating that the content item is a similar content item. In some embodiments, the method includes, in response to displaying the indicator, receiving a selection that indicates to filter the content item from the account.

In one embodiment, a program product includes a computer readable storage medium that stores code executable by a processor. The executable code, in certain embodiments, includes code to perform comparing, by use of the processor, a content item to previous content items corresponding to an account. The executable code, in various embodiments, includes code to perform determining whether the content item is a similar content item for the account based on the comparison between the content item and the previous content items. The executable code, in some embodiments, includes code to perform, in response to the content item being a similar content item for the account, determining whether to filter the content item from the account.

In certain embodiments, the executable code further includes code to perform comparing the content item to the previous content items corresponding to the account by comparing an item selected from the group comprising an image, a news story, a blog post, a video, a social media post, and an advertisement with the previous content items.

In one embodiment, the executable code further includes code to perform comparing the content item to the previous content items corresponding to the account by comparing the content item in a channel to the previous content items in the channel. In certain embodiments, the executable code further includes code to perform comparing the content item to the previous content items corresponding to the account by comparing the content item in a channel to the previous content items in multiple channels including the channel. In various embodiments, the executable code further includes code to perform determining whether the content item is a similar content item for the account based on the comparison between the content item and the previous content items by determining whether the content item matches a previous content item of the previous content items.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
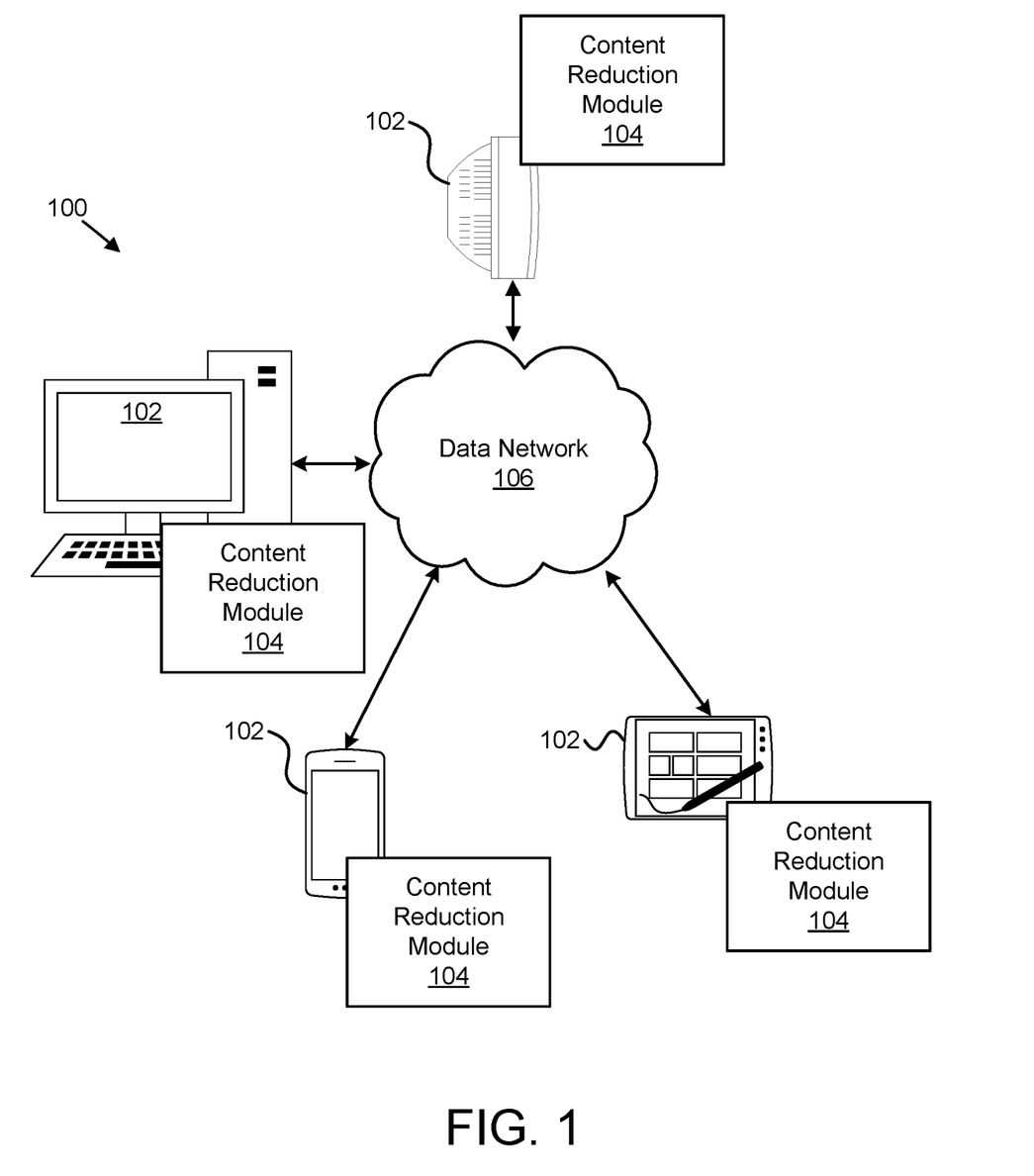
FIG. 1 is a schematic block diagram illustrating one embodiment of a system for filtering similar content items.

FIG. 1 depicts one embodiment of a system 100 for filtering similar content items. In one embodiment, the system 100 includes information handling devices 102, content reduction modules 104, and data networks 106. Even though a specific number of information handling devices 102, content reduction modules 104, and data networks 106 are depicted in FIG. 1, one of skill in the art will recognize that any number of information handling devices 102, content reduction modules 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the content reduction module 104. In certain embodiments, the content reduction module 104 may compare, by use of the processor, a content item to previous content items corresponding to an account. The content reduction module 104 may also determine whether the content item is a similar content item for the account based on the comparison between the content item and the previous content items. The content reduction module 104 may, in response to the content item being a similar content item for the account, determine whether to filter the content item from the account. In this manner, the content reduction module 104 may be used for filtering similar content items.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
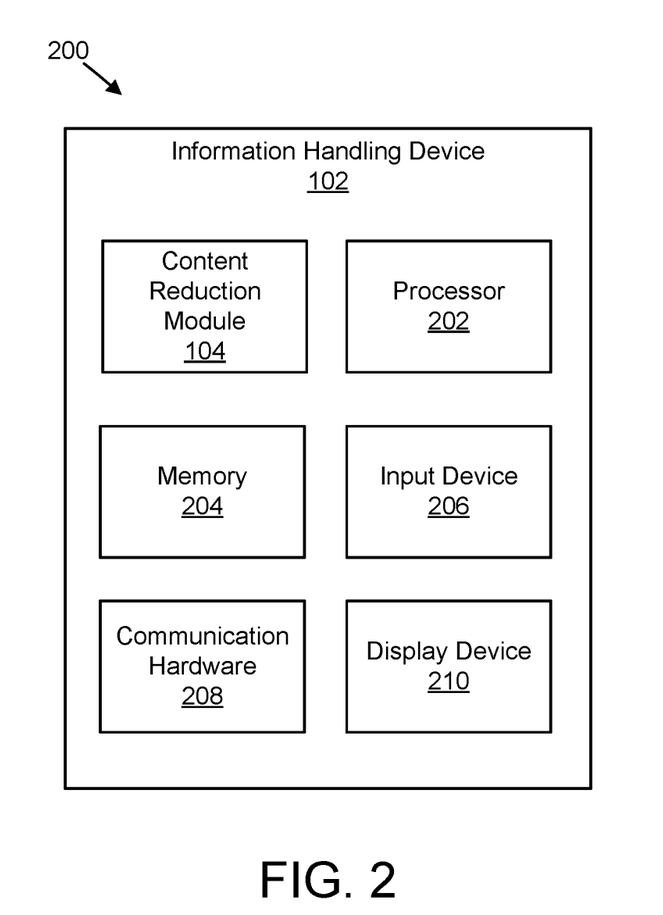
FIG. 2 is a schematic block diagram illustrating one embodiment of an apparatus including an information handling device.

FIG. 2 depicts one embodiment of an apparatus 200 that may be used for filtering similar content items. The apparatus 200 includes one embodiment of the information handling device 102. Furthermore, the information handling device 102 may include the content reduction module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the content reduction module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores data relating to content items. In some embodiments, the memory 204 also stores program code and related data, such as an operating system or other controller algorithms operating on the information handling device 102.

The information handling device 102 may use the content reduction module 104 for filtering similar content items. As may be appreciated, the content reduction module 104 may include computer hardware, computer software, or a combination of both computer hardware and computer software. For example, the content reduction module 104 may include circuitry, or the processor 202, used to compare, by use of the processor 202, a content item to previous content items corresponding to an account. As another example, the content reduction module 104 may include computer program code that determines whether the content item is a similar content item for the account based on the comparison between the content item and the previous content items. As a further example, the content reduction module 104 may include computer program code that, in response to the content item being a similar content item for the account, determines whether to filter the content item from the account.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the content reduction module 104.

Figure 3:
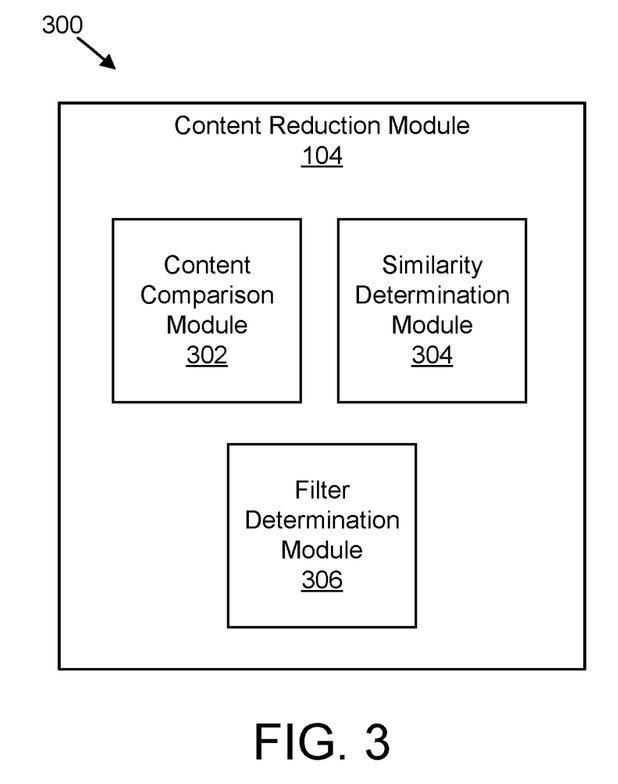
FIG. 3 is a schematic block diagram illustrating one embodiment of an apparatus including a content reduction module.

FIG. 3 depicts a schematic block diagram illustrating one embodiment of an apparatus 300 that includes one embodiment of the content reduction module 104. Furthermore, the content reduction module 104 includes a content comparison module 302, a similarity determination module 304, and a filter determination module 306.

In certain embodiments, the content comparison module 302 may compare, by use of the processor, a content item to previous content items corresponding to an account. In various embodiments, the content item may be an image, a news story, a blog post, a video, a social media post, an advertisement, or another content item. In some embodiments, the content item may be a new, unread, and/or unviewed content item, while the previous content items may have been previously viewed content items, previously shown content items, previously provided content items, or so forth. The content item may be a content item that a user is posting, and previous content items may be prior content items that the user has posted. The account may be any suitable type of account, such as a social media account, a user account, a mail account, a platform account, a computer account, a phone account, a website account, a browser related account, and so forth.

In certain embodiments, comparing the content item to the previous content items corresponding to the account includes comparing the content item in a channel to the previous content items in the channel (e.g., the content item and the previous content items are in the same channel). As may be appreciated, a channel may be any platform use to provide content, such as a social media platform, a news platform, a company platform, a user platform, a messaging platform, a chat platform, a texting platform, a posting platform, a blogging platform, and so forth.

In various embodiments, comparing the content item to the previous content items corresponding to the account includes comparing the content item in a channel to the previous content items in multiple channels comprising the channel (e.g., a set of different channels may be analyzed to compare the content item to previous content items). For example, a content item may be in a first social media channel, but the content item may be compared to previous content items in the first social media channel, a second social media channel, and a third social media channel. In some embodiments, a user may enable one channel to access previous content items of other channels. Moreover, in various embodiments, a user may enable a channel's previous content items to be accessed by one or more other channels. In certain embodiments, each channel may store previous content items into a central repository that may be accessed by channels.

In certain embodiments, a content item in a channel may be tagged as a previous content item in response to the content item being clicked on by a user, viewed for a predetermined period of time by a user, scrolled through by a user, watched by a user, listened to by a user, read by a user, tagged by a user, or so forth. In some embodiments, eye tracking software and/or a camera may be used to determine whether a user watches, views, and/or reads a content item.

In one embodiment, the similarity determination module 304 may determine whether the content item is a similar content item for the account based on the comparison between the content item and the previous content items. In some embodiments, determining whether the content item is a similar content item for the account based on the comparison between the content item and the previous content items includes determining whether the content item matches a previous content item of the previous content items. In such embodiments, the content item matching the previous content item may include: the content item being an exact match of the previous content item (e.g., the content item and the previous content item are exactly the same); the content item being about the same topic as the previous content item (e.g., a title of the content item and the previous content item are the same or similar, a subject of the content item and the previous content item are the same); and/or the content item has similar material to the previous content item (e.g., a predetermined percentage of the content item is the same or similar to the previous content item, such as greater than 50% of the content item is the same or similar to the previous content item).

In various embodiments, determining whether the content item is a similar content item for the account based on the comparison between the content item and the previous content items may include determining a percentage of contacts of the user that the user has already shared the content item with and/or determining a percentage of contacts of the user that have already had the content item shared with them by the user or other users.

In some embodiments, determining whether the content item is a similar content item for the account based on the comparison between the content item and the previous content items includes determining whether the content item is within a relational tolerance level of a previous content item of the previous content items. The relational tolerance level may be a predetermined percentage of the content item that relates to the previous content item, duplicates the previous content item, and/or matches the previous content item.

In various embodiments, the filter determination module 306 may, in response to the content item being a similar content item for the account, determine whether to filter the content item from the account. As may be appreciated, filtering the content may mean blocking the content from being viewed while logged into the account, hiding the content while logged into the account, blocking the content from the account, making the content not visible while logged into the account, placing the content into a different location within the account, not posting the content, not sharing the content, and so forth. In certain embodiments, determining whether to filter the content item from the account includes determining to filter the content item from the account based on an account setting. For example, an account setting may enable a user to indicate that similar content items are to be filtered from the account or not filtered from the account. In some embodiments, filtered content items may be stored in a previously filtered content item list. A user may access the previously filtered content item list to view and/or access previously filtered content items.

In various embodiments, determining whether to filter the content item from the account includes displaying an indicator indicating that the content item is a similar content item. The indicator may be used by a user seeking to post the content item to a channel and/or to share the content item with other users via a channel. In some embodiments, in response to displaying the indicator, a selection that indicates to filter the content item from the account may be received from the user. For example, based on the indicator, the user may determine not to post and/or share the content item (e.g., filter the content item) and may make a selection that indicates to filter the content item from the account.

Figure 4:
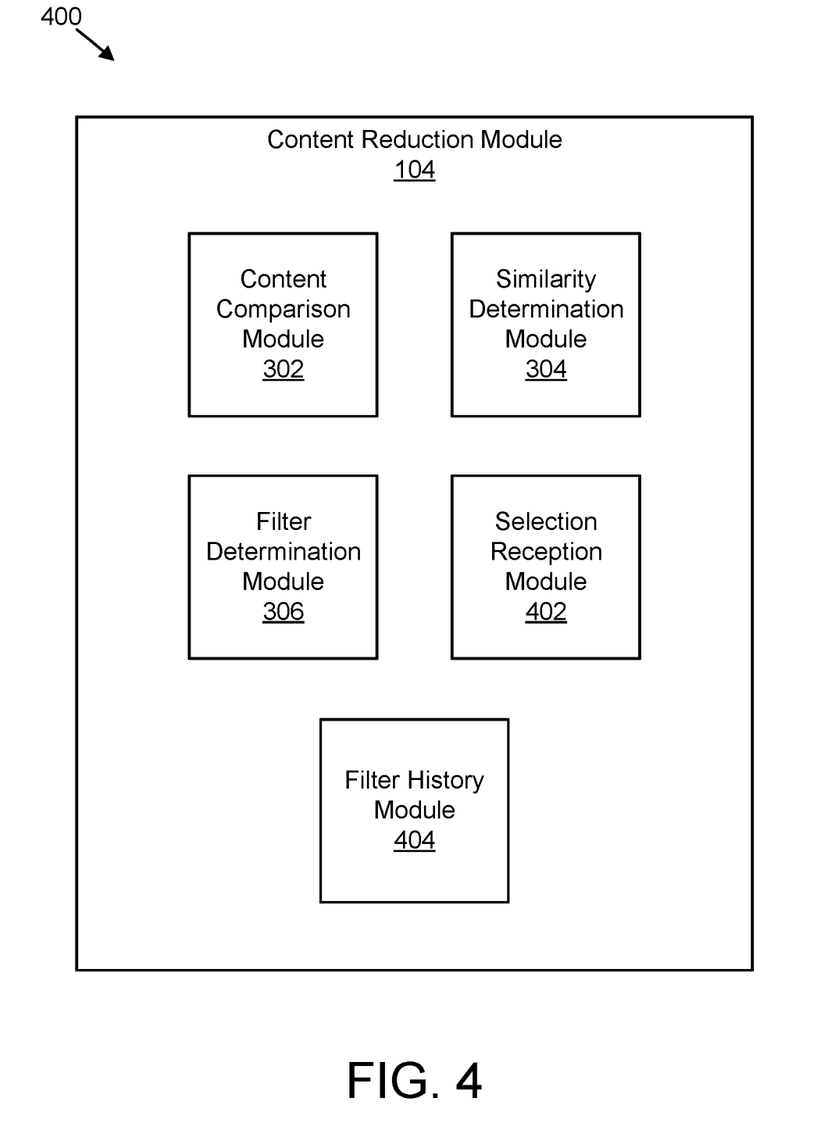
FIG. 4 is a schematic block diagram illustrating another embodiment of an apparatus including a content reduction module.

FIG. 4 is a schematic block diagram illustrating another embodiment of an apparatus 400 that includes one embodiment of the content reduction module 104. Furthermore, the content reduction module 104 includes one embodiment of the content comparison module 302, the similarity determination module 304, and the filter determination module 306, that may be substantially similar to the content comparison module 302, the similarity determination module 304, and the filter determination module 306 described in relation to FIG. 3. The content comparison module 302 optionally includes a selection reception module 402 and a filter history module 404.

In some embodiments, the selection reception module 402 may display an indicator indicating that the content item is a similar content item and, in response to displaying the indicator, may receive a selection that indicates to filter the content item from the account. The indicator may be used by a user seeking to post the content item to a channel and/or to share the content item with other users via a channel. In some embodiments, in response to displaying the indicator, a selection that indicates to filter the content item from the account may be received from the user. For example, based on the indicator, the user may determine not to post and/or share the content item (e.g., filter the content item) and may make a selection that indicates to filter the content item from the account.

In various embodiments, the filter history module 404 may determine to filter the content item from the account based on an account setting and may store the filtered content item in a previously filtered content item list. A user may access the previously filtered content item list to view and/or access previously filtered content items.

Figure 5:
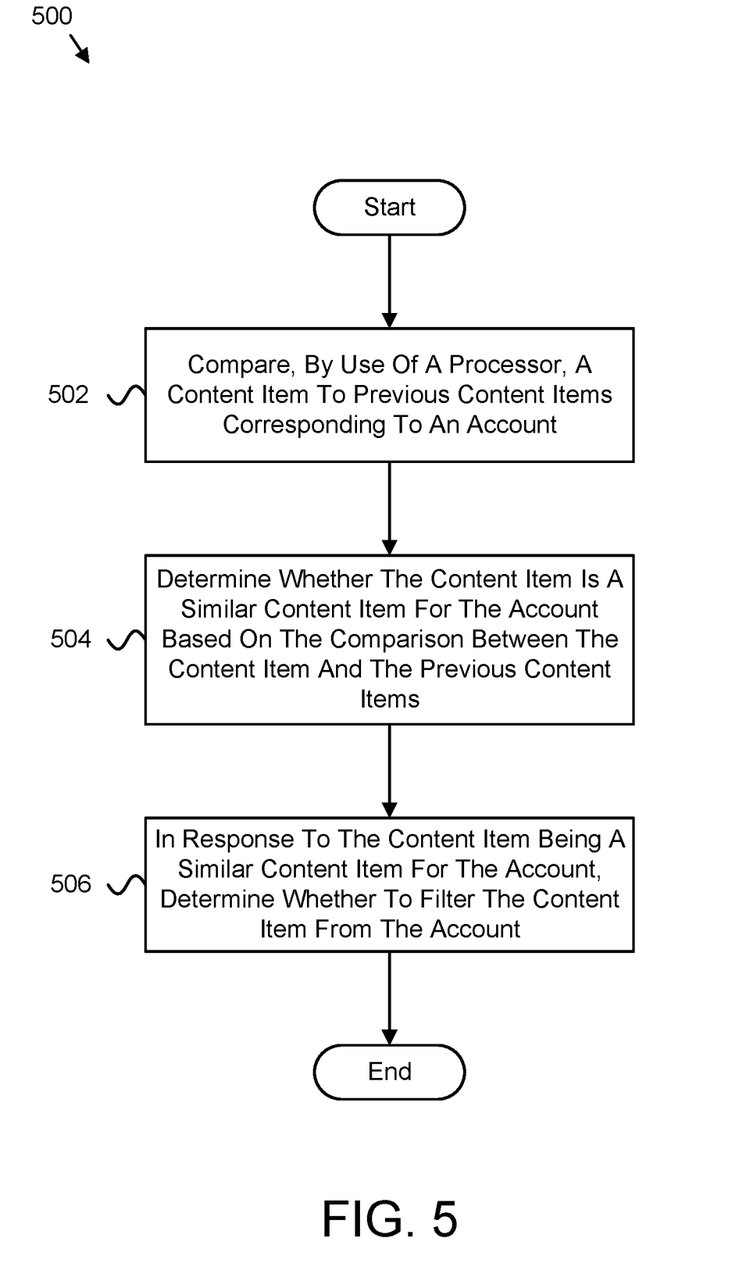
FIG. 5 is a schematic flow chart diagram illustrating an embodiment of a method for filtering similar content items.

FIG. 5 is a schematic flow chart diagram illustrating an embodiment of a method 500 for filtering similar content items. In some embodiments, the method 500 is performed by an apparatus, such as the information handling device 102. In other embodiments, the method 500 may be performed by a module, such as the content reduction module 104. In certain embodiments, the method 500 may be performed by a processor executing program code, for example, a microcontroller, a microprocessor, a CPU, a GPU, an auxiliary processing unit, a FPGA, or the like.

The method 500 may include comparing 502, by use of a processor (e.g., the processor 202), a content item to previous content items corresponding to an account. In certain embodiments, the content comparison module 302 may compare 502 the content item to previous content items corresponding to the account. In some embodiments, comparing 502 the content item to the previous content items corresponding to the account includes comparing an item selected from the group including an image, a news story, a blog post, a video, a social media post, and an advertisement with the previous content items. In various embodiments, comparing 502 the content item to the previous content items corresponding to the account includes comparing the content item in a channel to the previous content items in the channel. In one embodiment, comparing 502 the content item to the previous content items corresponding to the account includes comparing the content item in a channel to the previous content items in multiple channels including the channel.

The method 500 may include determining 504 whether the content item is a similar content item for the account based on the comparison between the content item and the previous content items. In some embodiments, the similarity determination module 304 may determine 504 whether the content item is a similar content item for the account based on the comparison between the content item and the previous content items. In certain embodiments, determining 504 whether the content item is a similar content item for the account based on the comparison between the content item and the previous content items includes determining whether the content item matches a previous content item of the previous content items.

In some embodiments, determining 504 whether the content item is a similar content item for the account based on the comparison between the content item and the previous content items includes determining whether the content item is within a relational tolerance level of a previous content item of the previous content items.

The method 500 may include, in response to the content item being a similar content item for the account, determining 506 whether to filter the content item from the account, and the method 500 may end. In some embodiments, the filter determination module 306 may determine 506 whether to filter the content item from the account. In various embodiments, determining 506 whether to filter the content item from the account includes determining to filter the content item from the account based on an account setting. In certain embodiments, the method 500 also includes storing the filtered content item in a previously filtered content item list. In some embodiments, determining 506 whether to filter the content item from the account includes displaying an indicator indicating that the content item is a similar content item. In various embodiments, the method 500 also includes, in response to displaying the indicator, receiving a selection that indicates to filter the content item from the account.

Figure 6:
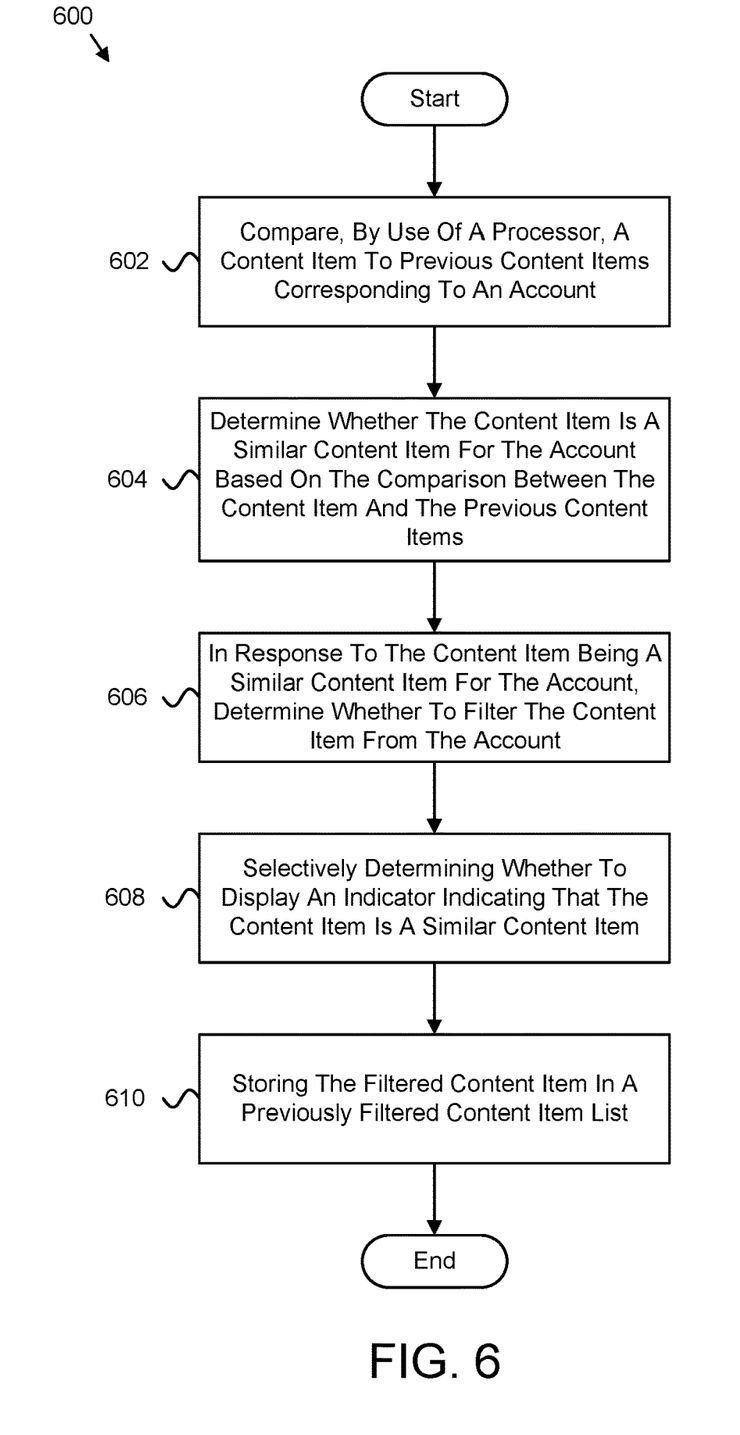
FIG. 6 is a schematic flow chart diagram illustrating another embodiment of a method for filtering similar content items.

FIG. 6 is a schematic flow chart diagram illustrating another embodiment of a method 600 for filtering similar content items. In some embodiments, the method 600 is performed by an apparatus, such as the information handling device 102. In other embodiments, the method 600 may be performed by a module, such as the content reduction module 104. In certain embodiments, the method 600 may be performed by a processor executing program code, for example, a microcontroller, a microprocessor, a CPU, a GPU, an auxiliary processing unit, a FPGA, or the like.

The method 600 may include comparing 602, by use of a processor (e.g., the processor 202), a content item to previous content items corresponding to an account. In certain embodiments, the content comparison module 302 may compare 602 the content item to previous content items corresponding to the account. In some embodiments, comparing 602 the content item to the previous content items corresponding to the account includes comparing an item selected from the group including an image, a news story, a blog post, a video, a social media post, and an advertisement with the previous content items. In various embodiments, comparing 602 the content item to the previous content items corresponding to the account includes comparing the content item in a channel to the previous content items in the channel. In one embodiment, comparing 602 the content item to the previous content items corresponding to the account includes comparing the content item in a channel to the previous content items in multiple channels including the channel.

The method 600 may include determining 604 whether the content item is a similar content item for the account based on the comparison between the content item and the previous content items. In some embodiments, the similarity determination module 304 may determine 604 whether the content item is a similar content item for the account based on the comparison between the content item and the previous content items. In certain embodiments, determining 604 whether the content item is a similar content item for the account based on the comparison between the content item and the previous content items includes determining whether the content item matches a previous content item of the previous content items.

In some embodiments, determining 604 whether the content item is a similar content item for the account based on the comparison between the content item and the previous content items includes determining whether the content item is within a relational tolerance level of a previous content item of the previous content items.

The method 600 may include, in response to the content item being a similar content item for the account, determining 606 whether to filter the content item from the account. In some embodiments, the filter determination module 306 may determine 606 whether to filter the content item from the account. In various embodiments, determining 606 whether to filter the content item from the account includes determining to filter the content item from the account based on an account setting. In some embodiments, determining 606 whether to filter the content item from the account includes displaying an indicator indicating that the content item is a similar content item. In various embodiments, the method 600 also includes, in response to displaying the indicator, receiving a selection that indicates to filter the content item from the account.

In various embodiments, the method 600 may include selectively determining 608 whether to display an indicator indicating that the content item is a similar content item. In certain embodiments, the selection reception module 402 may selectively determine 608 whether to display an indicator indicating that the content item is a similar content item.

In certain embodiments, the method 600 also includes storing 610 the filtered content item in a previously filtered content item list, and the method 600 may end. In some embodiments, the filter history module 404 may store 610 the filtered content item in a previously filtered content item list.

Figure 7:
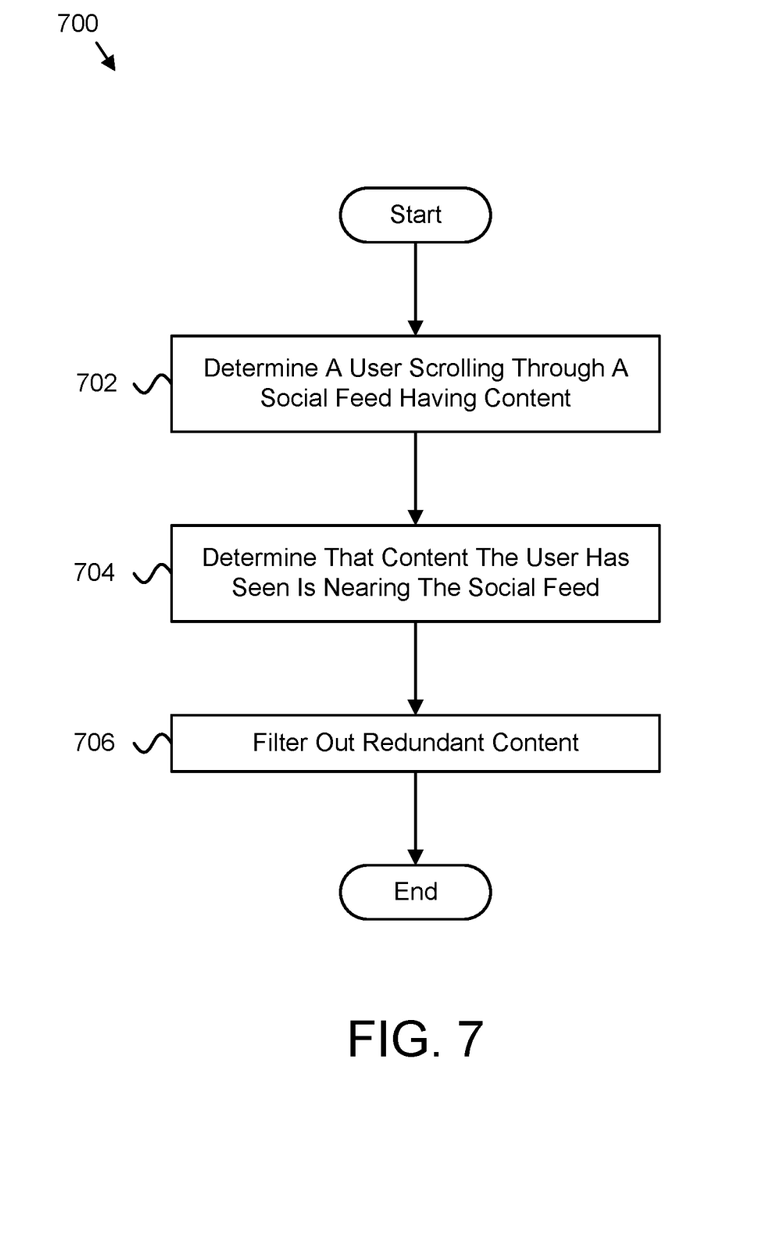
FIG. 7 is a schematic flow chart diagram illustrating a further embodiment of a method for filtering similar content items.

FIG. 7 is a schematic flow chart diagram illustrating a further embodiment of a method 700 for filtering similar content items. In some embodiments, the method 700 is performed by an apparatus, such as the information handling device 102. In other embodiments, the method 700 may be performed by a module, such as the content reduction module 104. In certain embodiments, the method 700 may be performed by a processor executing program code, for example, a microcontroller, a microprocessor, a CPU, a GPU, an auxiliary processing unit, a FPGA, or the like.

In some embodiments, the method 700 includes determining 702 a user scrolling through a social feed having content. The user may skip certain content in the social feed, the user may read certain content in the social feed, the user may view (e.g., view pictures) certain content in the social feed, and/or the user may watch certain video content in the social feed.

In various embodiments, the method 700 may include determining 704 that content the user has seen is nearing the social feed and/or added to the social feed. The method 700 may determine whether the content that the user is nearing and/or the content that is added to the social feed is redundant content (e.g., content that the user has already accessed, content similar to what the user has already accessed). In certain embodiments, the method 700 includes filtering 706 out the redundant content (e.g., making the redundant content not visible to the user in the social feed).

Figure 8:
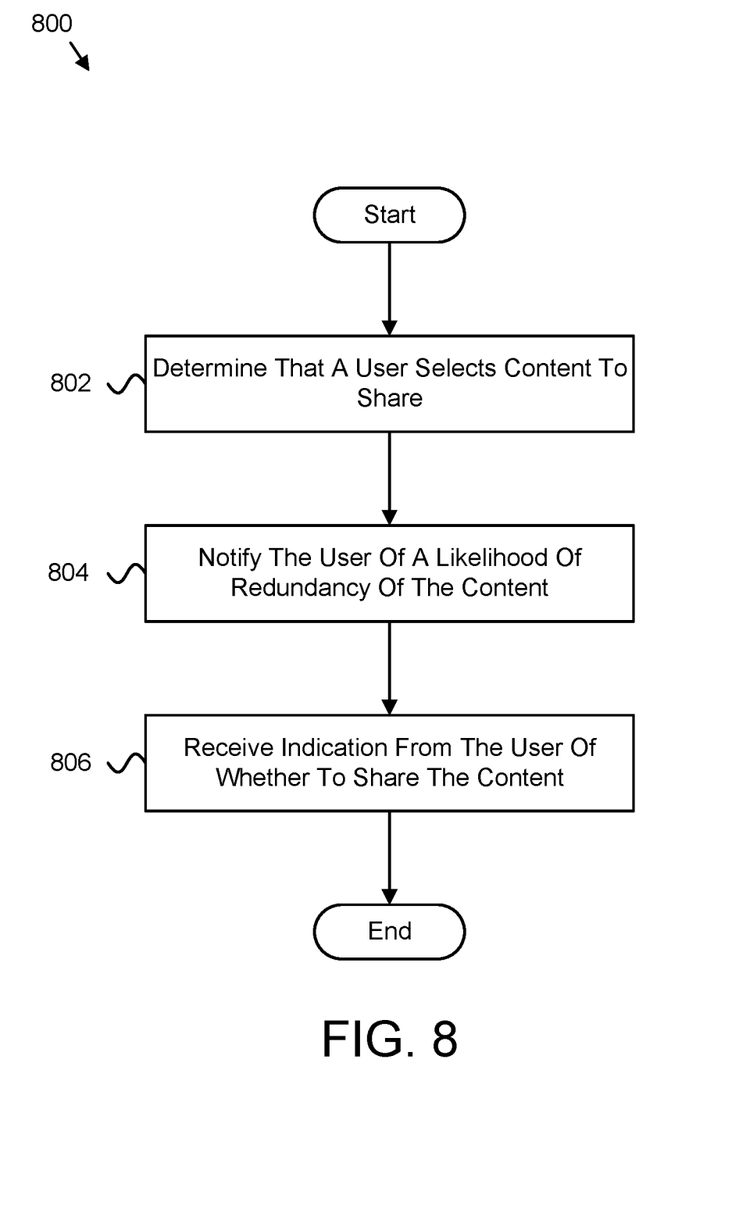
FIG. 8 is a schematic flow chart diagram illustrating yet another embodiment of a method for filtering similar content items.

FIG. 8 is a schematic flow chart diagram illustrating yet another embodiment of a method 800 for filtering similar content items. In some embodiments, the method 800 is performed by an apparatus, such as the information handling device 102. In other embodiments, the method 800 may be performed by a module, such as the content reduction module 104. In certain embodiments, the method 800 may be performed by a processor executing program code, for example, a microcontroller, a microprocessor, a CPU, a GPU, an auxiliary processing unit, a FPGA, or the like.

In some embodiments, the method 800 includes determining 802 that a user selects content to share via a channel, such as a social feed. In various embodiments, the method 800 may include notifying 804 the user of a likelihood of redundancy of the content if the user were to share the content. The likelihood of redundancy may be specific to the audience to which the content is directed. For example, if the user desires to share the content with 100 other users, the likelihood of redundancy may indicate a number out of 100 that the content would be redundant to.

In certain embodiments, the method 800 includes receiving 806 indication from the user of whether to share the content. The user may determine whether to share the content based on the likelihood of redundancy and may provide the indication about whether to share the content.

Figure 9:
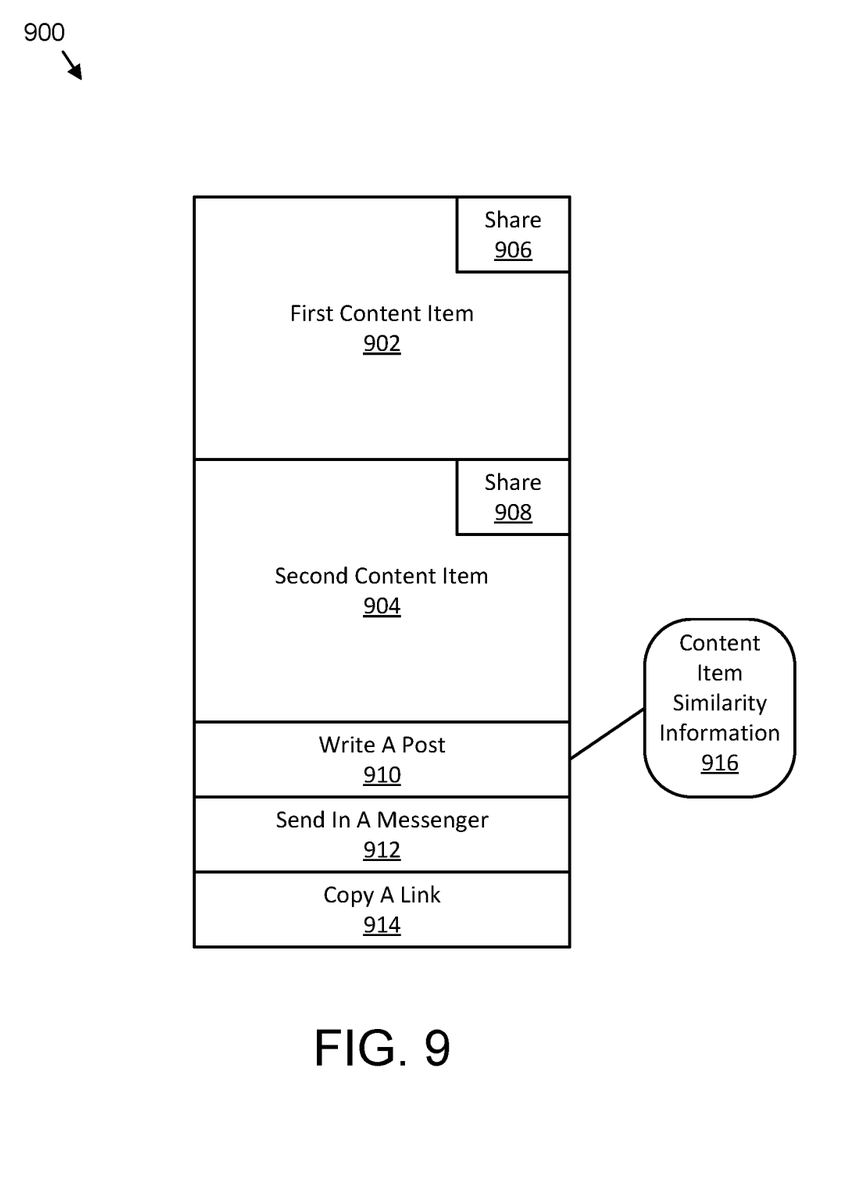
FIG. 9 is a schematic block diagram illustrating one embodiment of a social feed.

FIG. 9 is a schematic block diagram illustrating one embodiment of a social feed 900. In certain embodiments, the social feed 900 includes a first content item 902 and a second content item 904. Moreover, in various embodiments, the first content item 902 includes a share 906 option, and the second content item 904 includes a share 908 option. In some embodiments, in response to a user selecting the share 908 option of the second content item 904, options for sharing the second content item 904 may be displayed. The options for sharing the second content item 904 may include an option to: write a post 910, send in a messenger 912, and/or copy a link 914. In certain embodiments, in response to a user selecting the option to write the post 910, content item similarity information 916 may be displayed. The content item similarity information 916 may display information related to a number of friends of the user that have already seen the second content item 904 and/or a something closely related to the second content item 904. For example, the content item similarity information 916 may indicate that "68% of your friends have already seen this" or that "15% of your friends have already seen this." In various embodiments, the content item similarity information 916 may provide the user with an option to determine whether or not to still share the second content item 904 before the user shares the second content item 904.

Figure 10:
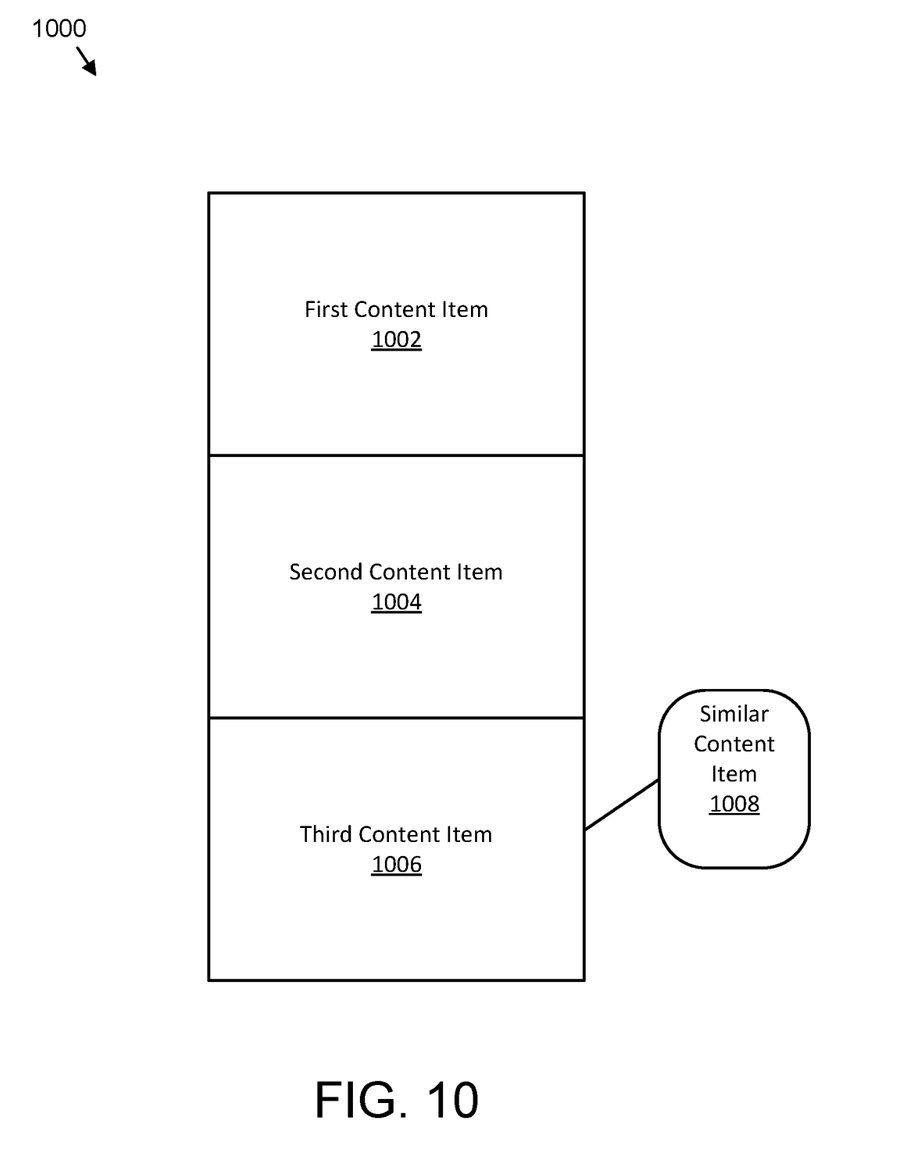
FIG. 10 is a schematic block diagram illustrating another embodiment of a social feed.

FIG. 10 is a schematic block diagram illustrating another embodiment of a social feed 1000. In some embodiments, the social feed 1000 includes a first content item 1002, a second content item 1004, and a third content item 1006. In certain embodiments, the third content item 1006 may be a similar content item 1008. In various embodiments, the user may select to hide similar content items so that they are not visible to the user when viewing their social feed 1000. In such embodiments, the third content item 1006 may be hidden from the social feed 1000 so that the third content item 1006 is not visible to the user viewing the social feed 1000.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
compare, by use of the processor, an item posted in a social media platform by a first user of a social media account to previous content items corresponding to an account, wherein the item posted in the social media platform is selected from the group comprising an image, a news story, a blog post, a video, a social media post, and an advertisement;

determine whether the item posted in the social media platform is a similar content item for the account based on the comparison between the item posted in the social media platform and the previous content items;

in response to the item posted in the social media platform being a similar content item for the account, determine whether to filter the item posted in the social media platform from the account; and in response to determining to filter the item posted in the social media platform, block the item posted in the social media platform from being visible in a social feed of the account.

2. The apparatus of claim 1, wherein the code executable by the processor determines whether to filter the item posted in the social media platform from the account by determining to filter the item posted in the social media platform from the account based on an account setting.

3. The apparatus of claim 2, wherein the code executable by the processor stores the filtered content item in a previously filtered content item list.

4. The apparatus of claim 1, wherein the code executable by the processor determines whether to filter the item posted in the social media platform from the account by displaying an indicator indicating that the item posted in the social media platform is a similar content item.

5. The apparatus of claim 4, wherein the code executable by the processor, in response to displaying the indicator, receives a selection that indicates to filter the item posted in the social media platform from the account.

6. A method comprising:

comparing, by use of a processor, an item posted in a social media platform by a first user of a social media account to previous content items corresponding to an account, wherein the item posted in the social media platform is selected from the group comprising an image, a news story, a blog post, a video, a social media post, and an advertisement;

determining whether the item posted in the social media platform is a similar content item for the account based on the comparison between the item posted in the social media platform and the previous content items;

in response to the item posted in the social media platform being a similar content item for the account, determining whether to filter the item posted in the social media platform from the account; and in response to determining to filter the item posted in the social media platform, blocking the item posted in the social media platform from being visible in a social feed of the account.

7. The method of claim 6, wherein comparing the item posted in the social media platform to the previous content items corresponding to the account comprises comparing the item posted in the social media platform in a channel to the previous content items in the channel.

8. The method of claim 6, wherein comparing the item posted in the social media platform to the previous content items corresponding to the account comprises comparing the item posted in the social media platform in a channel to the previous content items in a plurality of channels comprising the channel.

9. The method of claim 6, wherein determining whether the item posted in the social media platform is a similar content item for the account based on the comparison between the item posted in the social media platform and the previous content items comprises determining whether the item posted in the social media platform matches a previous content item of the previous content items.

10. The method of claim 6, wherein determining whether the item posted in the social media platform is a similar item for the account based on the comparison between the item posted in the social media platform and the previous content items comprises determining whether the item posted in the social media platform is within a relational tolerance level of a previous content item of the previous content items.

11. The method of claim 6, wherein determining whether to filter the item posted in the social media platform from the account comprises determining to filter the item posted in the social media platform from the account based on an account setting.

12. The method of claim 11, further comprising storing the filtered item in a previously filtered content item list.

13. The method of claim 6, wherein determining whether to filter the item posted in the social media platform from the account comprises displaying an indicator indicating that the item posted in the social media platform is a similar content item.

14. The method of claim 13, further comprising, in response to displaying the indicator, receiving a selection that indicates to filter the item posted in the social media platform from the account.

15. A program product comprising a computer readable storage medium that stores code executable by a processor, the executable code comprising code to perform:

comparing, by use of the processor, an item posted in a social media platform by a first user of a social media account to previous content items corresponding to an account, wherein the item posted in the social media platform is selected from the group comprising an image, a news story, a blog post, a video, a social media post, and an advertisement;

determining whether the item posted in the social media platform is a similar content item for the account based on the comparison between the item posted in the social media platform and the previous content items;

in response to the item posted in the social media platform being a similar content item for the account, determining whether to filter the item posted in the social media platform from the account; and in response to determining to filter the item posted in the social media platform, blocking the item posted in the social media platform from being visible in a social feed of the account.

16. The program product of claim 15, wherein the executable code further comprises code to perform comparing the item posted in the social media platform to the previous content items corresponding to the account by comparing the item posted in the social media platform in a channel to the previous content items in the channel.

17. The program product of claim 15, wherein the executable code further comprises code to perform comparing the item posted in the social media platform to the previous content items corresponding to the account by comparing the item posted in the social media platform in a channel to the previous content items in a plurality of channels comprising the channel.

18. The program product of claim 15, wherein the executable code further comprises code to perform determining whether the item posted in the social media platform is a similar content item for the account based on the comparison between the item posted in the social media platform and the previous content items by determining whether the item posted in the social media platform matches a previous content item of the previous content items.

* * * * *